United States Patent Office 3,539,869
Patented Nov. 10, 1970

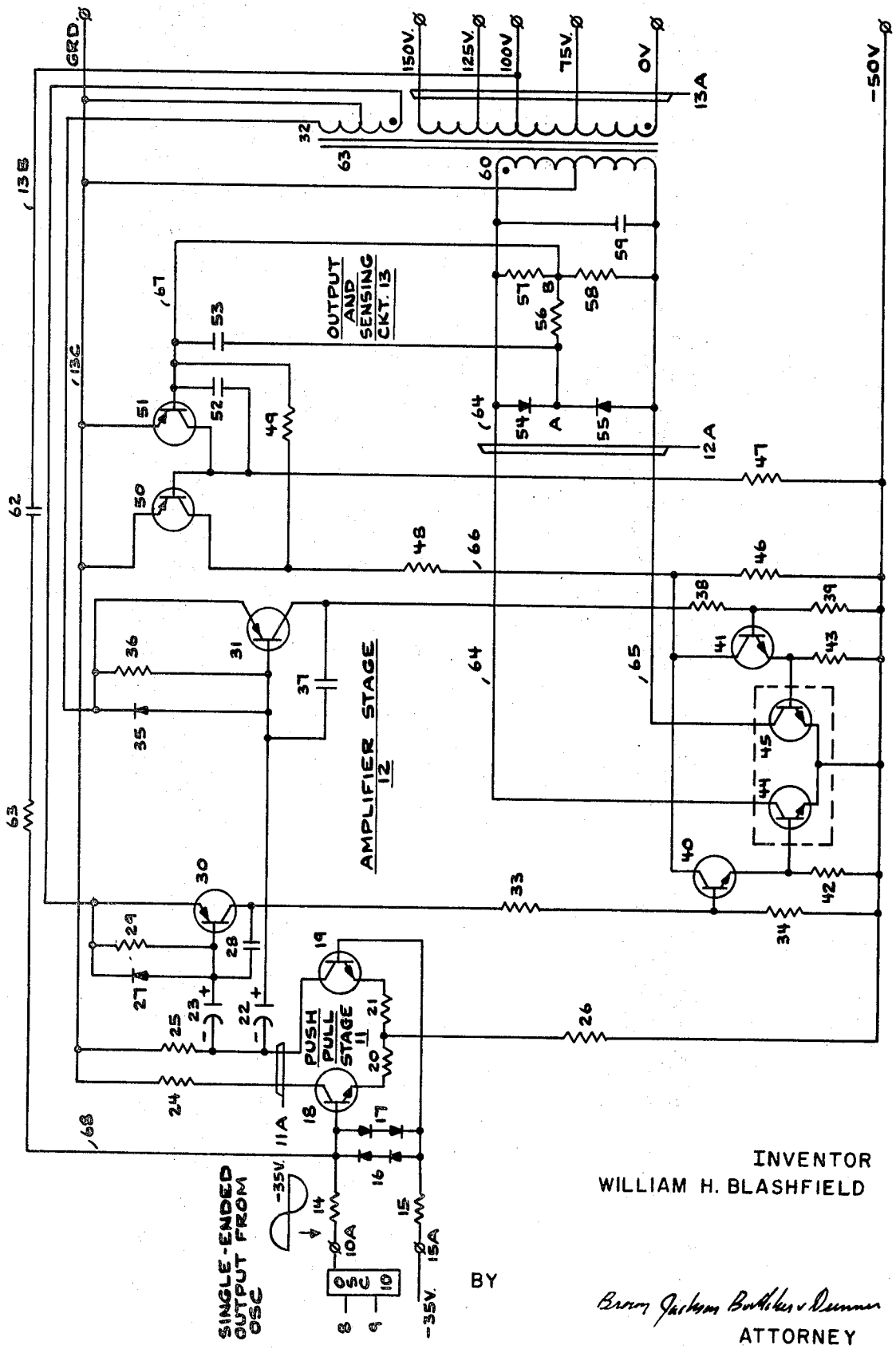

---

3,539,869
FREQUENCY GENERATOR WITH OVERLOAD PROTECTION
William H. Blashfield, Galion, Ohio, assignor to North Electric Company, Galion, Ohio, a corporation of Ohio
Filed Oct. 7, 1968, Ser. No. 765,548
Int. Cl. H02h 7/12; G05f 1/14
U.S. Cl. 317—33                                  10 Claims

ABSTRACT OF THE DISCLOSURE

A frequency generator having an output transformer for connecting the generator output to a load, and a sensing network comprising a pair of equal value resistances series connected across the primary winding of the transformer to derive a signal with the occurrence of an overload condition which as compared with a reference signal controls associated transistor means in the adjustment of the output of an amplifier stage in the generator to provide a reduced current output to the load. As the sensor means detects an end to the overload condition, the signal output of the transistor means returns the amplifier output and the load current to a normal value.

BACKGROUND OF THE INVENTION

Field of the invention

The present invention relates to overload protection for alternating current power supplies including automatic reset after overload. See class 321, subclasses 11, 14 and class 323, subclass 22.

Description of the prior art

In most electrical systems, the occurrence of short circuits and like faults are generally dangerous, and frequently, by reason of the excessive current flows which occur, will result in damage to the system and its components. For this reason, various types of protective devices, such as fuses, circuit breakers, and the like, were developed to detect unusual current or voltage situations and to disconnect the power from the system before damage occurs. In the earlier equipment normal operation was restored by manual reset of the protective device.

As the art developed, more sophisticated sensing and detection means were provided which are operative with and overload detection to effect a disconnect of the load from the power supply, and to periodically reconnect the power supply for a short interval of time to determine whether the fault has been cleared. If the fault is found to have been removed at the time of the "reconnect," switch means are operated to connect the power supply to the system for normal operation. Such mode of operation results in unnecessary power losses.

Circuits are known in which the output load current is prevented from exceeding a predetermined maximum value even in the case of a short circuit. When the predetermined value of current is reached, the current in such circuits will not increase regardless of how low the load impedance becomes. With an overload condition, therefore, such type circuit operates in a constant current mode at or above the maximum rated output current. It is obvious that a substantial power dissipation occurs in the components of the circuit when the system is operating in the constant current mode during an overload condition. Moreover, it is frequently desirable to use a circuit under overload conditions while yet maintaining a near zero output current. Such mode of operation is, however, not practical with a circuit such as described which operates with a high current output during an overload condition.

While at least one attempt has been made heretofore in the prior art (U.S. Pat. No. 3,305,793) to reduce the output current and voltage to a low value with the occurrence of an overload condition, such system is more complex and is more costly by reason of the excessive amount of circuitry which is used in such arrangement.

SUMMARY

The present invention is directed to a novel circuit which employs unique overload detection means for operating in the described mode which utilizes, in the main, components which are already in the protective circuit. After detection of the overload condition, the circuit responds in such a way that the drive to the output circuit is reduced which in turn reduces the current in the output circuit. This reduction in current is detected by the same detection means which responsively effect a still further reduction in the output current. Such mode of operation continues until the overload current is reduced to a safe value. When the overload or the short circuit condition is removed, the circuit by itself returns to its normal operating condition. There is no need for manual resetting or periodic checking of overload conditions as required in most prior art devices. Also, due to the regenerative type of protection scheme, the current is kept at a very low value during the overload condition and power losses are reduced to a minimum.

GENERAL DESCRIPTION

The novel circuit is set forth in the FIG. 1 which comprises the only drawing of the disclosure. As there shown, a conventional wien bridge type oscillator 10 is connected to a suitable power source by conductors 8, 9, and, as energized oscillator 10 supplies a sinusoidal output of a predetermined frequency over conductor 10A to the input circuit for a push-pull driver stage 11. A fixed —35 volts direct current bias is supplied over conductor 15A to driver stage 11. The output of the push-pull driver stage 11 is fed over path 11A to an amplifier stage 12 and the amplified output of circuit 12 is fed over path 12A to an output and sensing stage 13 for application to a load (not shown). A feedback path for effecting a constant voltage output extends from the output of the circuit over conductor 13B back to the input circuit for push-pull stage 11. Sensor means in circuit 13 are operative to direct the occurrence of overload conditions, and to provide control signals over path 66 to reduce the drive provided by the amplifier stage 12 for the output circuit, and thereby minimize the current to the load during an overload condition.

DETAILED DESCRIPTION OF THE PREFERRED EMBODIMENT

Oscillator circuit 10, which may be of the wien bridge type, is shown connected over conductors 8, 9 to a suitable direct current source, and is operative, as energized, to generate a sinusoidal output superimposed on a direct current of —35 volts. The sinusoidal output of oscillator 10 is fed over resistance 14 to one input for push-pull stage 11. Suitable controls (not shown) may be provided in known manner to adjust the value of resistance relative to the value of the capacitance in the oscillator bridge and thereby vary the frequency of the output to different values.

Push-pull stage 11 basically comprises a pair of transistors 18, 19 connected in a push-pull amplifier configuration.

The sine wave input from oscillator 10 is connected to the base of transistor 18, and a fixed —35 v. bias potential on input 15A is connected to the base of transistor 19. The emitters of the transistors 18 and 19 are connected through the resistors 20 and 21 respectively and common resistor 26 to −50 v. direct current, and the collectors are connected over resistors 24, 25 to ground. A feedback circuit, to be described, provides signals derived from the load over conductor 68 to the base of transistor 18.

Diodes 16 and 17 are connected between the input path 10A and −35 volt bias conductor 15A to protect the transistors 18 and 19 in case of occurrence of a very large voltage difference between the base and the emitter elements. The collector output of transistors 18, 19 is coupled over coupling capacitors 22, 23 to an input to amplifier stage 12. Both transistors 18, 19 are forward biased.

Amplifier stage 12 basically comprises three pairs of transistors 30, 31; 40, 41; and 44, 45. With reference to the first pair of transistors 30, 31, the collector output of push-pull transistors 18, 19, is connected to the bases of transistors 31, 30 respectively. The emitters of transistors 30, 31 are respectively connected over opposite ends of a feedback winding 32 to ground, and the collectors are connected over resistors 33 and 38 to the base elements of the next pair of transistors 40, 41, and further over resistors 34, 39 to the −50 v. supply source. Diodes 27, 35 are connected to protect the base-emitter circuits of transistors 30, 31 respectively from possible reverse voltages. Capacitors 28, 37 are connected between the base-collector circuit of transistors 30, 31 respectively to prevent high frequency oscillation.

In operation, as the positive half cycle output from the oscillator 10 is fed over path 10A to the base of transistor 18, the transistor 18 conducts more and, by reason of the common emitter connection, transistor 19 conducts less. During the subsequent negative half cycle transistor 18 conducts less, and transistor 19 conducts more. As transistor 18 conducts more during the positive half cycle, a negative pulse is produced at the collector of transistor 18 and fed over the capacitor 22 to the base element of transistor 31. During the negative half cycle of the oscillator output, the transistor 19 conducts more to provide a negative current pulse over capacitor 23 to the base element of transistor 30.

As transistors 30, 31 are thus caused to conduct in alternating half cycles by the outputs of the push-pull transistors 18, 19, a more positive signal is applied alternately to the bases of transistors 40 and 41 to thereby turn on NPN transistors 40, 41 during alternate half cycles. Summarily transistors 18, 31 and 41 conduct during the positive half cycle of the oscillator sinewave signal on conductor 10A, and transistors 19, 30 and 40 conduct during the negative half cycle of such sine wave. The manner in which the feedback signals over path 68 to the input circuit for push-pull stage 11 and over feedback winding 32 to the amplifier stage 12 effect a constant voltage output for the load will be described in more detail hereinafter.

Transistors 40, 41, the conduction of which is controlled by transistors 18, 31, are also controlled by feedback signals applied to the collectors over resistor 48 and conductor 66 by the output and sensing circuit 13 as will be described. The collectors of transistors 40, 41 are also connected over resistor 46 to the −50 v. source, and the emitters are connected over resistors 42, 43 to the −50 v. supply, and also to the bases of a pair of transistors 44, 45.

Transistors 44, 45 which have their bases connected to the output of the transistors 40, 41, have emitters connected common to the −50 v. supply, and collectors connected over path 12A to drive the output and sensing circuit 13.

As transistor 40 is turned on during the positive half cycle of the oscillator 10 in the manner described above, a more positive signal is applied to the base of transistor 44 to cause the same to conduct. In the negative half cycle of the oscillator waveform, transistor 41 is turned on by transistor 31, and a more positive signal is applied to the base of transistor 45, which turns on.

It will be seen therefrom that transistors 44 and 45 conduct on alternate half cycles of the waveform output of oscillator 10, and are effective in such conduction to alternately connect −50 volts negative potential to the conductors 64, 65 respectively of path 12A. Conductors 64, 65 are connected to opposite ends of the primary winding 60 of a load transformer 63. A sensing circuit including resistor network 56, 57, 58 and diodes 54, 55, is connected across the primary winding 60 to derive control signals for enabling a pair of control transistors 50, 51 in the control of transistors 40, 41 in the amplifier stage 12 in an operational mode to be described.

Transformer 63 includes a primary winding 60 and a first secondary winding 61 having a plurality of taps which are shown connected to provide 0 v., 75 v., 100 v., 125 v. and 150 v. respectively. A load may, of course, be connected across selected ones of the taps.

Since transistors 44 and 45 conduct in alternate half cycles, and the negative pulse outputs of transistors 44, 45 are connected alternately to opposite ends of the primary winding 60 of transistor 63 (the midpoint of which is connected to ground), the voltages in the two halves of the primary winding 60 differ in phase by 180°. Such alteration produces a sinusoidal voltage across the secondary winding 61 of the transformer 63. A similar alternation occurs in the secondary winding 32, which has a center tap connected to ground and its end terminals connected to the emitter of transistors 30, 31, respectively, whereby a positive potential is applied to the emitter of transistor 30 in one half cycle of the output signal and a positive potential is applied to the emitter of transistor 31 in the alternate half cycle of the output signal. Since the value of the signal varies with the voltage across winding 32, the conductivity of the transistors 30, 31 is adjusted with changes in the load voltage and the voltage is maintained at a substantially constant value. As a further control one tap (the 100 v. tap in the illustrated embodiment) is connected to provide a feedback circuit over conductor 13B, capacitor 62 and resistor 63 to the input circuit for the push-pull stage 11. The feedback signals which vary with the voltages which appear on the 100 v. tap provide a variable input to transistor 18 in push-pull stage 11, to vary the conductivity thereof in accordance with the value of the feedback signal, whereby the voltage output of the transistor 60 is further made more constant.

In addition to the provision of a constant voltage output, the novel circuit further includes an arrangement for producing a reduced current output in the event of the occurrence of an overload condition. That is, as noted above, a pair of equal value resistors 57, 58 are connected across conductors 64, 65 and thereby the primary winding 60 of transformer 63. A pair of diodes 54, 55 connected back to back have the junction of their cathode elements (point A) connected over resistor 56 to the junction of the equal value resistors 57, 58 (point B) to provide a reference voltage for the sensor resistors 57, 58. Filter capacitor 53, connected to filter any ripples which might occur at Point A and capacitor 59, is connected across primary winding 60 to bypass any alternating current components of magnetizing current which may occur in winding 61. The signal which appears at the junction of resistors 56, 57, 58 is applied over conductor 67 to the base of control transistor 51.

Transistor 51 further has an emitter connected to ground and a collector connected over resistors 49, 48 and conductor 66 to the collectors of the transistors 44, 45 in the amplifier stage 12, and also over resistor 46 to the −50 volt source. Capacitor 52 is connected between the base and collector elements of transistor 51 to minimize the possibility of improper operation of transistor 51. Transistor 50 has an emitter connected to ground, a base connected to the collector of transistor 51 and a collector connected over resistor 48 and conductor 66 to the collector of transistors 44, 45 and also over resistor 46 to ground.

With the base of transistor 50 connected over resistor 47 to −50 v. source, and the emitter connected to ground, the PNP transistor 50 will be normally conductive (assuming transistor 51 is turned off). Such assumption is proper for normal load conditions by reason of the positive potential which appears at point A during such condition. That is, with a normal load (i.e., not an overload) transistor 45 conducts in one half cycle of the waveform output of oscillator 10 (as described above) to complete a path from −50 v. over transistor 45, conductor 65, the lower portion of transformer primary winding 60 and the center tap to ground. The upper end of transformer 60 will be positive, and conductor 64 will be positive relative to conductor 65, and diode 54 will therefore conduct (the anode of diode 54 is more positive than its cathode) to place point A at the more positive potential of conductor 65. Such potential via resistor 56 and conductor 67 biases the PNP transistor 51 to turn off. During the next half cycle, transistor 45 conducts and diode 55 operates in like manner to maintain point A at a more positive potential than conductor 64. During normal operation therefore (i.e., absent an overload condition), transistor 51 is turned off and the base of the PNP transistor 50 is biased by the negative potential connected over resistor 47 to effect conduction thereof.

Assuming, now, an overload condition, a heavy current will flow in the secondary winding 61 of the output transformer, and will, in turn, produce large currents alternately in the two halves of the primary winding 60. This flow of large current through winding 60 produces a significant negative voltage drop across the resistance of the winding itself, and through resistances 57 and 58 tends to make the potential at point B more negative.

The application of this negative bias over conductor 67 to the base of PNP transistor 51 tends to make transistor 51 conduct. The conduction of transistor 51 results in the connection of ground to the base of PNP transistor 50, which (having its emitter connected to ground) conducts less, which in turn results in a more negative potential at the collectors of the NPN transistors 40 and 41. Accordingly, both transistors 40 and 41 conduct less. Since transistors 40, 41 provide the drive for the next stage of transistors 44 and 45, the transistors 44 and 45 likewise conduct less and a lower voltage is impressed on the primary winding 60. The voltage in the transformer secondary winding is correspondingly reduced and a related reduction in the load current is experienced.

The reduced conductivity of transistors 44 and 45 not only limits the current under overload conditions but of like importance reduces the current. That is, when transistors 44 and 45 conduct less, the positive direct current voltage at point A is reduced, and hence the transistor 51 will be forward biased with the occurrence of an even smaller negative potential at point B (that is, with the positive potential a point A reduced, a smaller value of current through the transformer winding 60 will turn on transistor 51, and in turn make transistor 50 conduct still less). Ultimately, transistors 44 and 45 conduct less and reduce the output voltage and hence the overload current (in the manner described above). The above mentioned process goes on until transistor 51 goes into saturation at which time the overload current has been reduced to a predetermined safe value.

Removal of the overload condition results in the removal of the negative potential at point B, whereby the base of transistor 51 is connected to the positive potential of point A through resistor 56, and transistor 51 accordingly turns off, which in turn results in transistor 50 turning on and the circuit returns to its normal mode of operation.

The desired output frequency can be varied by adjustment of the capacitor and resistor values in the oscillator 10 in known manner. The output voltage can be chosen to supply loads at a desired value by connecting the load to the appropriate taps on the secondary winding 61 of the output transformer 63.

I claim:

1. In a frequency generator having input means for connection to a source of sinusoidal waveforms, circuit means connected to said input means including a first control means, an output transformer having a primary and secondary winding, means for connecting the output of said circuit means to the primary winding of said transformer, means for connecting a load to said secondary winding, overload current detection means including the primary winding resistance of said transformer and a first and a second resistance means of equal value connected in series across said primary winding, and voltage reference means for deriving from the transformer voltage a reference voltage at the junction of said resistance means, a second control means connected to said junction operative to provide a changing signal output in response to a changing potential at said junction, and means connecting said changing signal output to said first control means thereby enabling said first control means to reduce the output thereof to said transformer primary winding.

2. A frequency generator as set forth in claim 1 in which said voltage reference means comprise a first and a second diode connected back to back across said primary winding, and resistance means connecting the junction of said diodes to the junction of said first and second resistance means.

3. A frequency generator as set forth in claim 1 in which said second control means comprises transistor means biased to provide a first output signal for normal load conditions and to provide signals of different values responsive to occurrence of an overload condition and the change of value of the potential at said junction of said equal resistance members.

4. A frequency generator as set forth in claim 1 in which said circuit means includes a push-pull stage connected to said input means, and an amplifier stage connected to the output of said push-pull stage, and in which said first control means includes an input circuit for connecting said changing signal output of said second control means to correspondingly adjust the output of said transformer.

5. A frequency generator as set forth in claim 1 in which said circuit means includes an amplifier stage including a first and a second transistor, and means connected between said input means and said first and second transistor to effect conduction of the first and second transistor in alternate cycles of the sinusoidal waveform input, and in which said first control means include bias means for said first and second transistors and means for connecting said changing signal output of said second control means to elements of said first and second transistors connected to said bias means.

6. A frequency generator as set forth in claim 1 in which said transformer primary winding is center tapped, and in which said first control means includes a third and a fourth transistor connected for control by the output signals of said first and second transistor respectively, and in which the means for connecting the output of said circuit means to said primary winding are connected between the output of said third and fourth transistor and opposite end terminals of said center tapped primary winding.

7. A frequency generator as set forth in claim 1 in which said primary winding is center tapped to produce a direct current voltage change at the junction point of the said equal resistors with the occurrence of an overload condition in the secondary winding of said output transformer.

8. A frequency generator as set forth in claim 1 in which said second control means comprises a first transistor connected to the junction point of said two resistance means, bias means for biasing said first transistor to near turn off with the voltage at said junction point at normal load conditions, a second transistor biased to conduct with said first transistor near turn off and to conduct at different levels of conduction of said first transistor, and in which said means for providing said changing signal output to said first control means is connected between the output of said second transistor and said first control means.

9. In a frequency generator having input means for connection to the output of an oscillator comprising a push-pull driver stage connected to the output of said oscillator, an amplifier stage connected to the output of said push-pull driver stage including a first and a second output for providing alternate signal outputs, an output transformer having a primary with a center tap and a secondary winding said center tap being connected to ground, means for connecting a load to said secondary winding, means for connecting said first and second outputs of said amplifier stage to the opposite end terminals of said primary winding, a first and a second resistor of equal value, means connecting said first and second resistor in series across said primary winding, a pair of semiconductor diodes, means connecting the anodes of said diodes respectively to said first and second outputs of said amplifier stage, means connecting the cathodes of the said diodes to the junction point of the said equal resistors, control means connected to the junction of said equal resistors, means for biasing said control means to provide a first output signal with a normal load on said secondary winding, and a second output signal responsive to an overload on said secondary winding, means connecting said signal outputs to said amplifier stage, means in said amplifier stage operative in response to said second output signal to reduce the signal output of said amplifier stage to said primary winding, the resultant reduction in signal output to said primary winding, said diodes and said resistors effectively reducing the voltage at the junction point of said equal resistors to effect a further reduced output from said amplifier stage, to thereby ultimately provide a very low output voltage and current to the load during the overload condition.

10. A frequency generator as set forth in claim 9 which includes feedback means including a further secondary winding on said transformer connected to said push-pull circuit to normally maintain an essentially constant output voltage for the load.

References Cited

UNITED STATES PATENTS 3,305,793   2/1967   Kammiller _____ 331—62

JAMES D. TRAMMELL, Primary Examiner

U.S. Cl. X.R.

321—14; 323—9, 22; 331—62